Figure 1:
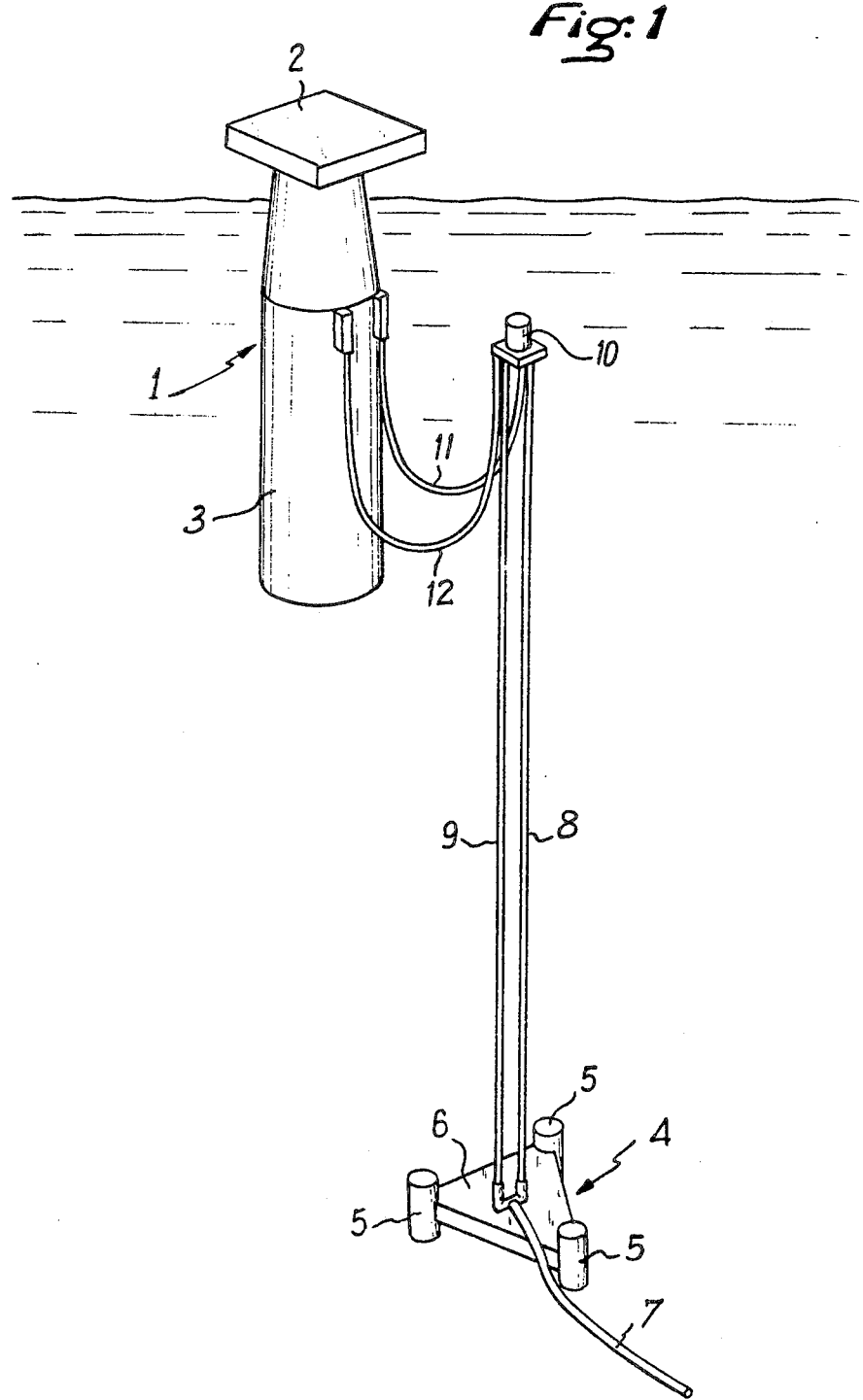

United States Patent [19]

Behar et al.

[11] 4,019,213
[45] * Apr. 26, 1977

[54] PIPING APPARATUS FOR A FLOATING OR SEMI-SUBMERSIBLE PLATFORM

[75] Inventors: Isaac Behar, Paris; Maurice Genini, Creteil, both of France

[73] Assignee: Coflexip, Rueil-Malmaison, France

[ * ] Notice: The portion of the term of this patent subsequent to Oct. 14, 1992, has been disclaimed.

[22] Filed: Sept. 16, 1975

[21] Appl. No.: 613,914

Related U.S. Application Data

[63] Continuation of Ser. No. 414,197, Nov. 9, 1973, abandoned.

[30] Foreign Application Priority Data

Nov. 9, 1972 France .................... 72.39657

[52] U.S. Cl. .................... 9/8 P; 137/236
[51] Int. Cl.$^2$ .................... B63B 35/02
[58] Field of Search ............ 9/8 P; 114/.5 R, .5 D, 114/.5 T, 230, 206 R; 137/236; 166/.5, .6

[56] References Cited
UNITED STATES PATENTS

| | | |
|---|---|---|
| 3,472,032 | 10/1969 | Howard .................... 9/8 P |
| 3,503,443 | 3/1970 | Blanding et al. .................... 9/8 P |
| 3,557,396 | 1/1971 | Rupp .................... 9/8 P |
| 3,667,239 | 6/1972 | Mott .................... 9/8 P |
| 3,774,253 | 11/1973 | Lecomte .................... 9/8 P |
| 3,911,688 | 10/1975 | Behar et al. .................... 9/8 P |

*Primary Examiner*—Trygve M. Blix
*Assistant Examiner*—Charles E. Frankfort
*Attorney, Agent, or Firm*—Brisebois & Kruger

[57] ABSTRACT

Apparatus for connecting at least one pipe-line situated on a sea-bed to a floating or semi-submersible platform which includes a vertical pipe-line section consisting of at least one flexible pipe arranged between a sinker resting on the sea-floor and an air-tank submerged at a sufficient depth to be protected from the action of the swell, the buoyancy of the air-tank being such that it maintains the flexible pipe section vertically under tension, the lower portion of the pipe-line of the section being connected to the pipe-line or lines situated on the sea-bed, while the upper end pipe-line of the section is connected to the submerged body of the platform by at least one additional pipe-line which is flexible along at least certain of its portions.

3 Claims, 7 Drawing Figures

PIPING APPARATUS FOR A FLOATING OR SEMI-SUBMERSIBLE PLATFORM

This is a continuation of application Ser. No. 414,197, filed Nov. 9, 1973 and now abandoned.

The present invention relates to novel piping for connecting a submarine oil-well to a floating or semi-submersible platform for example.

It is known that it is more and more frequenctly necessary to extract petroleum from fields on sea-beds. While until recently the oil fields thus worked have been relatively close to shore and the depths of water were some tens of meters, oil working must now be considered well off-shore and at depths in excess of 100 meters, even 500 meters.

Conventional techniques for treatment of crude oil, storage and evacuation are then unsuitable; it is particularly difficult to construct the foundations necessary for the construction of conventional platforms and it is then necessary to have recourse to floating or semi-submersible solutions.

The present invention relates to apparatus for supplying or evacuating a floating or semi-submersible platform; it may be employed to connect marine oil-wells to a treatment platform or else to connect a storage or loading terminal to wells or to a pipe-line; more generally, the apparatus which is the object of the present invention enables fluids to be conveyed to or from a floating or semi-submersible platform.

In the following description, the case is more particularly descirbed of a storage and loading terminal of an oil field but it is obvious, as mentioned above, that the piping apparatus which is the object of the present invention enables various fluids to be conveyed to or from a floating or semi-submersible platform.

A floating or semi-submersible storage and loading terminal of an oil-field is for example substantially in the form of an elongate vertical cylinder having large dimensions and weight, so as to hold above the level of the water a work platform which remains beyond the reach of the waves and relatively stable despite the motion of the swell.

Such a platform, which is still of course subject to the action of the tides, is held in position by any suitable apparatus such as several cables or chains which secure it to anchors or submerged concrete blocks on the surface of the sea-bed, or by dynamic positioning systems.

Generally, such platforms contain reservoirs of sufficient dimensions to collect the petroleum produced over several days by several wells situated around the platform in order to permit easy evacuation by the ships which approach the platform to take on their loads there.

The object of the present invention is to provide apparatus to connect a pipe-line situated on a sea-bed to a floating or semi-submersible platform, characterized by the fact that it includes a vertical section formed by at least one flexible pipe, the said section being arranged between a sinker resting on the sea-floor and an air-tank submerged at a sufficient depth to protect it from the action of the swell, the buoyancy of the said air-tank being such that it maintains the flexible pipe or pipes of this section vertically under tension, the lower portion of the said section being connected to piping situated on the sea-floor, while the upper end of the section is connected to the submerged body of the platform by at least one pipe-line which is flexible in at least certain of its parts.

In a preferred embodiment of the invention, the vertical section is preferably formed of several flexible pipes positioned in parallel. These flexible pipes are for example of the type having shaped steel wire reinforcements and at least one water-tight sheath.

The fact of using, in accordance with the invention, flexible pipes which are held under tension between the upper air-tank and the lower sinker offers the advantage of easy setting in place of the pipe apparatus, as explained below.

Similarly, the flexible pipes have the advantage of not resisting the action of marine currents which may be present with excessive regidity.

When the height of the section is particularly large, it is possible to position intermediate air-tanks on this section to ensure that the different pipes are held apart from each other. Each air-tank has its suitable buoyancy to tension the pipes below it.

In accordance with the invention, it is also preferable for the pipe-line or lines resting on the sea bed and terminating in oil-well heads for example, to be formed of flexible pipes of the type described above.

In a first embodiment of the apparatus in accordance with the invention, the connection between the air-tank and the platform is provided by at least one flexible pipe suspended by its ends on the one hand from the air-tank (being connected to the vertical pipe section) and on the other hand from the floating platform (being connected to a reservoir or other evacuation apparatus).

As the connecting pipe-lines between the air-tank and the platform are submerged at a depth which protects them from the influence of the swell, they permit the platform to rise or fall, depending on the height of the tide, without being subject to stresses which would risk damaging them.

On the other hand, these connecting pipe-lines are not submerged at great depth and they may easily be inspected, repaired or even changed within the normal working limits of under-water divers.

This particularly simple embodiment nevertheless has the disadvantage that when a current of sufficient force acts in the direction from the air-tank to the platform, it is possible for the air-tank and the pipes which are connected to it to bear against the platform, which risks damaging them.

When such a current is to be feared, it is possible to use a second embodiment of the invention.

In accordance with this second embodiment, the air-tank is connected to the submerged portion of the platform body which is substantially at its level by an arm pivoted on the one hand on the platform and on the other on the air-tank, the connecting pipe-line or lines being attached to this arm.

It will be understood that under these conditions the upward or downward motions of the platform which are due to the tide result in only small variations in the spacing between the air-tanks and the platform, without there being any risk of the air-tank bearing against the submerged portion of the platform body.

By way of guidance, the length of the arm may be some tens of meters for example.

The arm is constructed in any manner, for example by a lattice-work structure. At its end connected to the submerged platform body, it preferably has a sufficient width to be able to resist pivoting forces relative to the platform body about a vertical axis.

In this embodiment it suffices to form the connecting pipe-lines of flexible pipes adjacent to the points of articulation of the arm on the platform body and the air-tank and the remainder of the pipe-lines may be made of rigid pipes.

A further object of the present invention is a process for placing in position the apparatus described above.

This process is characterized by the fact that on the surface of the sea a float which is subsequently destined to form the sinker is connected to the end of at least one pipe-line designed to rest on the sea-bed, the said pipe line being connected to the air-tank by at least one pipe-line designed to form the vertical section; that the float subsequently destined to form the sinker is submerged by filling it with a sufficient quantity of water and that its descent is controlled until the pipe-line of the vertical section is in a vertical position suspended from the air-tank and the sinker comes to rest on the sea-bed; that concrete or any other ballasting material is optionally injected into the sinker to give is sufficient stability; that the buoyancy of the air-tank is optionally adjusted to provide sufficient upward traction of the pipe-line of the vertical section; and that the end of the vertical pipe-line which terminates at the air-tank is connected to the platform by at least one at least partially flexible pipe-line.

When the pipe-line is connected to the platform body by a pivoted arm, it is possible prior to submersion to connect the pipe-line which form the vertical section directly to the air-tank body, by means of flexible pipe-lines which are carried by the arm. However, this operation may also be carried out at the end of the positioning process.

It will be seen that the process in accordance with the invention enables the apparatus which has been described to be placed in position in a particularly simple and efficient manner.

It is also possible to lay guide-cables for future use, running from the sinker, which, where necessary, permit replacement of either the pipes forming the vertical section or the flexible pipes resting on the sea-bed and running to the sinker; the connection and disconnection of these pipes to and from the sinker may be effected by means of remotely controlled automatic apparatus.

A further object of the present invention is to provide another process for placing the apparatus in position, this process being characterized by the fact that controlled submersion of the sinker is effected by attaching guide cables to it which are connected at the top to the air-tank which is submerged while being retained by the said cables; that the pipe-line connections at the sinker are effected by means of flanges which are rigidly attached to the ends of the pipe-lines to be connected and which are submerged while being guided by the cables, coupling of the flanges being carried out automatically to form the connections between the pipe-lines.

In accordance with this process, positioning of the sinker and the air-tank is facilitated, by virtue of the absence of the flexible pipe-lines, and the positioning of the latter may be carried out subsequently by means of the guide-cables which permit precise location of the automatic coupling flanges.

In order to provide a better understanding of the invention, two illustrative embodiments, selected as examples and illustrated in the attached drawings, will now be described.

Figure 2:
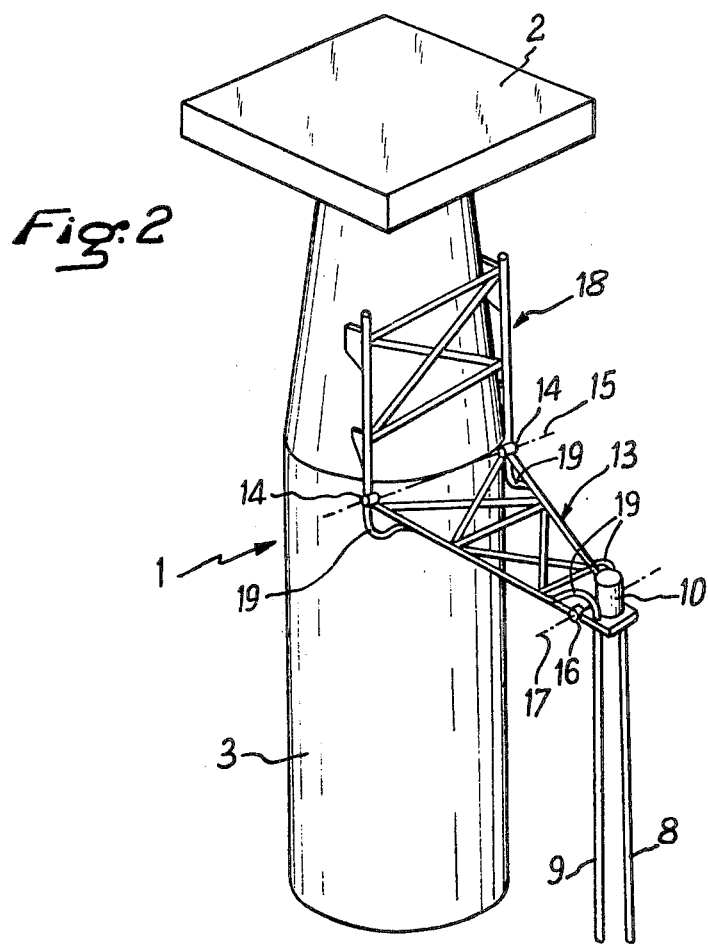
Figure 6:
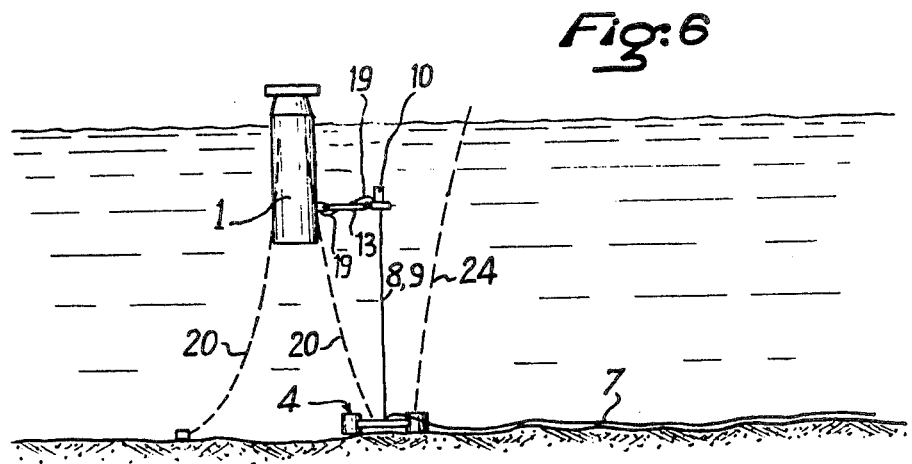
Figure 7:
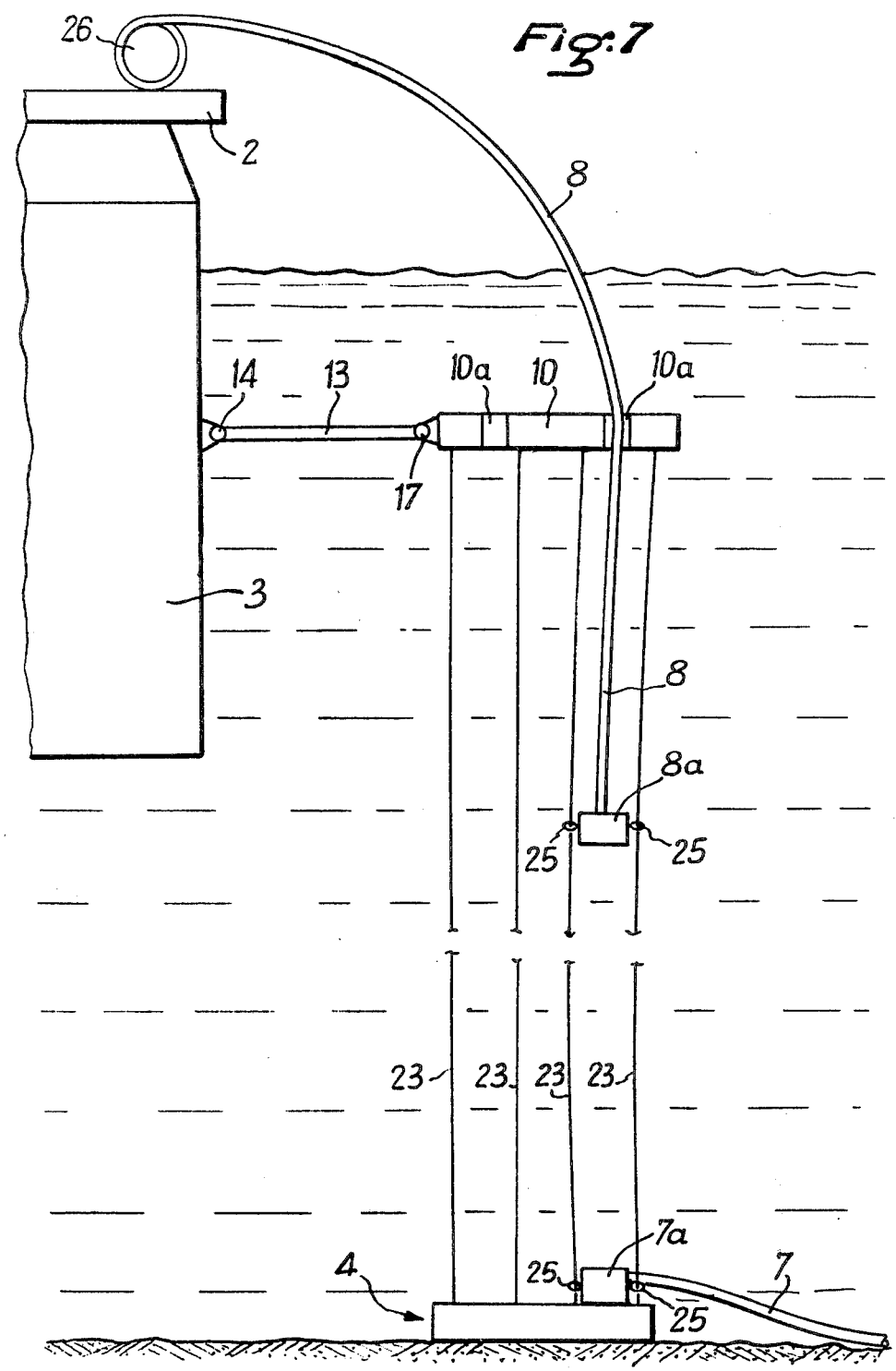

In these drawings:

FIG. 1 shows a diagram of the apparatus in accordance with a first embodiment of the invention, FIG. 2 is a perspective view to a larger scale of the upper portion of the apparatus, in accordance with a second embodiment of the invention, FIGS. 3 to 6 show diagrammatically the different phases of placing the apparatus in accordance with the invention in position, FIG. 7 shows diagrammatically the placing in position of the piping apparatus in accordance with a second process in accordance with the invention.

FIG. 1 shows diagrammatically a first simplified embodiment of the invention.

This FIGURE shows the semi-submersible floating platform indicated as a whole by reference number 1.

This platform 1 has a deck 2 which is always kept at a sufficient distance above the level of the sea to be protected from the action of the waves and which rests on a cylindrical body 3 submerged vertically at a sufficient depth not to be subjected to the motion of the swell.

This body 3 in particular comprises storage reservoirs for example for several days production of the well or wells from which the petroleum is to be collected on the platform, or else means for treatment of the petroleum products.

FIG. 1 also shows the sinker, indicated as a whole by the reference number 4, which in the present case consists of three cylindricl capactities 5 connected by a triangular plate 6 forming a base. This sinker 4 rests on the sea-bed.

A flexible pipe 7 brings the petroleum from a wellhead, which is not shown in the drawings, to sinker 4.

In the embodiment shown, the connection between sinker 4 and the body 3 of platform 1 is effected by means of two pipe-lines which are connectd to the end of pipe 7. It is self-evident that there could be any number of these pipe-lines.

The vertical section is formed of pipes 8 and 9, which are attached at their lower ends to sinker 4 and are connected to pipe 7, and at their upper ends are attached to floating air-tank 10.

Floating air-tank 10 is submerged at a sufficient depth to protect it from the influence of the swell.

However, it is advantageous to keep this air-tank 10 at as small a depth as possible so as to permit easy access and convenient work for under-water divers.

The positioning of sinker 4 relative to platform 1 is such that air-tank 10 is at least ten meters distant, for example, from platform body 3.

The connections between the upper ends of vertical pipes 8 and 9 and the reservoirs contained by platform body 3, are effected by means of flexible pipes 11 and 12, which are suspended vertically at their ends and which permit vertical motion of the platform due to the action of the tides.

Air-tank 10 may be of any form, but must however have sufficient buoyancy to provide vertical traction on pipes 8 and 9. It may be provided with ballast-tanks to adjust its buoyancy to the required value.

When the distance separating air-tank 10 from sinker 4 is relatively large, it is possible to position several intermediate air-tanks at different levels so as to maintain the spacing between pipes 8 and 9 and to distribute the buoyancy action over several vertical sections.

FIG. 2 shows a modification of the embodiment of FIG. 1.

This modification relates solely to the portion which provides the connection between air-tank 10 and platform body 3.

In accordance with this preferred embodiment of the invention, air-tank 10 is connected to platform body 3 by an arm 13, formed for example as a metal latticework which is hinged at 14 to platform body 3 to pivot about a horizontal axis 15, and which is similarly hinged at 16 to air tank 10 to be able also to pivot about a horizontal axis 17.

In a modification, air-tank 10 may be attached directly to the end of arm 13 without pivot axes, flexible pipes 8 and 9 compensating for the oscillations of the arm.

Pivots 14 are supported by a fixed structure 18 of the sufficient strength which is secured to the platform body, preferably at the time of manufacture of the latter.

At the ends of arm 13 flexible pipes 19 permit connection of pipe-lines 8 and 9 to the platform body. Flexible pipes 19 may be situated along the whole length of arm 13, or may only be placed at the ends of the latter, the median portion of the arm then being provided with rigid pipes to which flexible pipes 19 are connected.

It will be seen that, by means of the modification just described, platform 1 may rise and fall depending upon the height of the tides, while maintaining air-tank 10 and pipe-lines 8 and 9 of the vertical section at a substantailly constant distance.

FIGS. 3 to 6 show diagrammatically the different stages in the process in accordance with the invention which permits easy positioning of the apparatus shown in FIG. 2.

Figure 3:
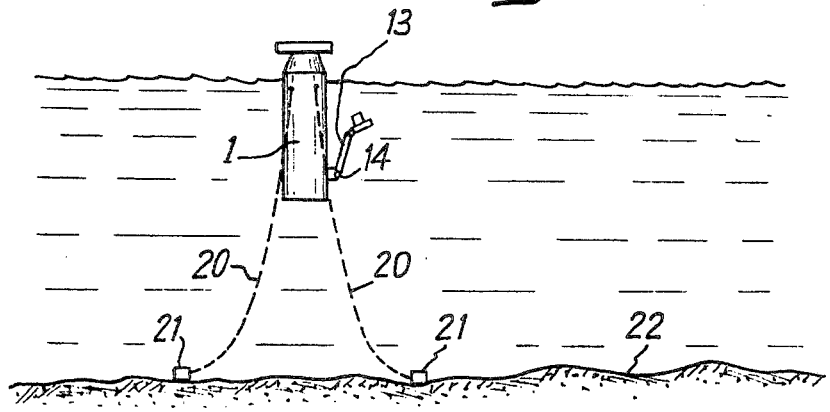

FIG. 3 shows platform 1 which has been anchored conventionally by being secured by chains 20 to anchoring devices 21 positioned on the sea-bed 22. The platform already includes arm 13 and air-tank 10.

Figure 4:
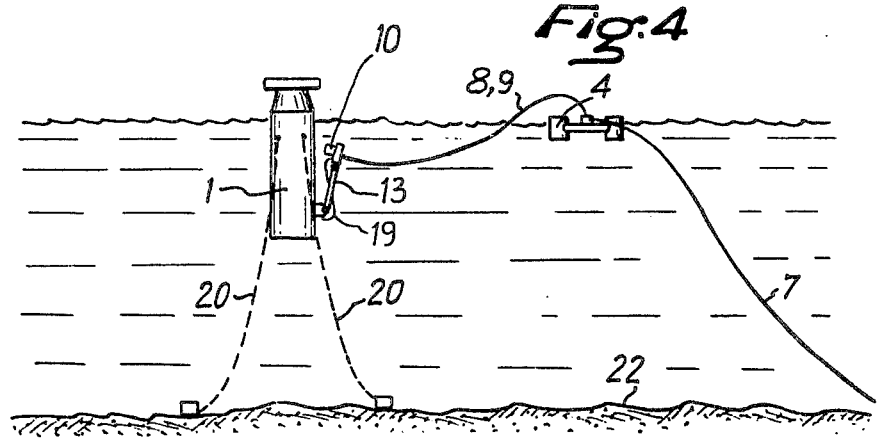

In a second stage, and as shown in FIG. 4, float 4 which is subsequently destined to form the sinker is brought up, and to it is secured the end of flexible pipe 7 which is connected to the head of the well of which the production is to be extracted. Of course, if there were several wells, several pipe-lines would be laid.

Pipe 7 is then connected to flexible pipes 8 and 9, which are to form the vertical section and which are connected to air-tank 10, while flexible pipes 19 connect the upper ends of pipe-lines 8 and 9 to the reservoir contained in the platform body.

In the position shown in FIG. 4, cylinders 5 included by sinker 4 are filled with air and make the latter buoyant. Similarly the tank of air-tank 10 is also filled with air to make it as light as possible.

In the following phase, shown in FIG. 5, sinker 4 is progressively submerged by introducing a sufficient quantity of water into air-tanks 5 and controlling its descent with any suitable apparatus.

Figure 5:
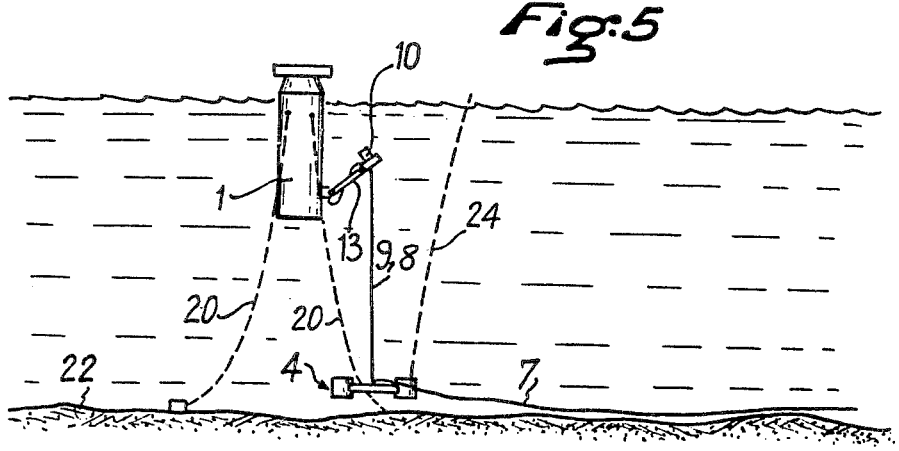

In the position shown in FIG. 5, sinker 4 which has a slight negative buoyancy maintains pipe-lines 7 and 8 in a vertical position, their upper portions being connected to air tank 10.

A temporary pipe-line 24 connects the surface to tanks 5 of sinker 4 and in the following phase enables concrete or another ballasting material to be injected into the tanks so as to impart sufficient stability and weight to sinker 4.

At the end of the operation the assembly formed by air-tank 10, vertical pipe-lines 7 and 8 and sinker 4 is lowered until the latter rests on the sea-bed, as shown in FIG. 6.

During this movement, arm 13 pivots about hinge 14 while air-tank 10 is being submerged to the position which it is to occupy.

Tanks 5 of the sinker are then filled for example with concrete by means of pipe-line 24, which gives the sinker the weight which it requires to hold the section of pipe-lines 8 and 9.

The buoyancy of air-tank 10 is then optionally adjusted to provide sufficient upward traction on pipe-lines 8 and 9.

It will be seen that the process just described permits apparatus in accordance with the invention to be placed in position in a particularly simple manner, without it being necessary to carry out particular work at great depth.

In fact the organs which are situated at the level of arm 13 or air-tank 10 are at a sufficiently small depth for them to be mounted and maintained without difficulty by lightly equipped under-water divers.

Moreover, sinker 4 and the different pipe-lines which are connected to it are assembled at the surface, which avoids any work at great depth.

For the case in which it would be required to replace certain of these pipe-lines, it is easy at the time of laying of sinker 4 to provide guide-cables which permit disconnection and placing in position of new pipe-lines 7, 8 or 9, disconnection and connection being effected automatically by means of conventional remotely controlled apparatus.

FIG. 7 shows diagrammatically how placing in position of the apparatus is effected in accordance with a process other than the one described above.

FIG. 7 again shows platform body 3, sinker 4 which rests on the sea-floor and air-tank 10 which in the present embodiment is in the form of a relatively flat, for example circular structure, which has orifices 10a for passage of pipes 7 and 8 which form the vertical section of the pipe-lines.

Air-tank 10 is attached to platform body 3 by arm 13 pivoted at 14 and 17.

According to this process in accordance with the invention, air-tank 10 is connected to sinker 4 by vertical guide-cables 23. These cables are secured to sinker 4 before submersion of the latter.

FIG. 7 also shows how flexible pipe 7 provided with its flange 7a has been brought onto sinker 4 by guide-cables 23 which are on the right of FIG. 7.

Eyelets or similar organs 25 rigidly attached to flange 7a slide on cables 23.

FIG. 7 similarly shows how flexible pipe 8 provided with flange 8a, guided by eyelets or similar organs 25 which slide on guide cables 23, is lowered to be coupled automatically to flange 7a.

As shown in the upper portion of the FIGURE, pipe 8 passes into orifice 10a of air-tank 10 as it is unwound from a reel 26 positioned on the deck of the platform.

It will be seen that by means of this process it is possible to place the pipe-lines in position with great ease once sinker 4, which is secured by the guide cables to air-tank 10, has been submerged.

It will also be seen that it is very easy to replace the different pipe-lines.

In the embodiment of FIG. 7, the connection between the ends of the vertical pipe-lines and platform body 3 is effected as described above.

The work necessary to place the connecting pipe-lines in position may be carried out with lightly equipped divers in view of the shallow depth.

It will be well understood that the embodiments described above have been given purely by way of example and that they may be subjected to any desirable modifications without thereby departing from the scope of the invention.

In particular, pipe-lines 8 and 9 which form the vertical section could be constructed of conventional rigid steel pipes, although this is less convenient than if flexible pipes are used, for it implies a swivel joint, at least on sinker 4.

Similarly, it is clear that the vertical section may be constructed with any number of pipes.

Finally, it will be understood without difficulty that, on single platform, it is possible to attach a certain number of oscillating arms 13 distributed around the periphery of the platform body.

Under these circumstances, the petroleum from a relatively large number of wells may be brought to a same platform using the appartus and process in accordance with the invention which have been described above.

We claim:

1. Apparatus for the collection of oil from wells in a deep body of water, said apparatus comprising:
    a sinker including container means having a volume sufficient to support said sinker at the surface of the water when said container means is full of air and to hold said sinker at the bottom of said body of water when said container means is full of water,
    a float of adjustable buoyancy,
    first flexible pipe means located between said float and said sinker,
    means supported by said sinker for connecting said first flexible pipe means to second flexible pipe means leading to a submarine well, said first flexible pipe means being of a length such as to hold said float only so far beneath the surface of said body of water as to protect said float from the influence of the surface swell when said sinker is on said bottom and to be kept in tension while doing so,
    a floating platform comprising a body including oil storage means immersed vertically beneath the surface of said body of water, and an upper part located on top of said body, said upper part being provided with an upper deck emerging above the surface of said body of water, and
    conduit means between said platform and float connecting said storage means to said first flexible pipe means, said conduit means comprising an arm pivotally connected at one end to said float and at its other end to said body and additional flexible pipe means extending the length of said arm and connected to said first flexible pipe means.

2. Apparatus for the collection of oil from wells in a deep body of water, said apparatus comprising:
    a sinker including container means having a volume sufficient to support said sinker at the surface of the water when said container means is full of air to hold said sinker at the bottom of said body of water when said container means is full of water,
    a float of adjustable buoyancy,
    first flexible pipe means located between said float and said sinker,
    means supported by said sinker for connecting said first flexible pipe means to second flexible pipe means leading to a submarine well, said first flexible pipe means being of a length such as to hold said float only so far beneath the surface of said body of water as to protect said float from the influence of the surface swell when said sinker is on said bottom and to be kept in tension while doing so,
    a floating platform comprising a body including oil storage means immersed vertically beneath the surface of said body of water, and an upper part located on top of said body, said upper part being provided with an upper deck emerging above the surface of said body of water, and
    conduit means between said platform and float connecting said storage means to said first flexible pipe means, said conduit means comprising an arm pivotally connected at one end to said float and at its other end to said body, rigid pipes carried by the median portion of said arm, and additional flexible pipes connecting one end of said rigid pipes to said storage means and the other end of said rigid pipes to said first flexible pipes.

3. Apparatus for the collection of oil from wells in a deep body of water, said apparatus comprising
    a floating platform having oil storage means near the surface of the water,
    a float of adjustable buoyancy,
    sinker means adapted to lie at the bottom of said body of water,
    flexible pipe means connecting said sinker means to said float, said flexible pipe means being of a length such that it holds the float only so far below the surface of the body of water as to protect it from the influence of the surface swell while said flexible pipe means is kept under tension between said float and sinker means,
    and conduit means between said platform and float connecting said storage means to said flexible pipe means, at least part of said conduit means being movalbe in a vertical plane to accommodate changes in the relative vertical positions of said float and said storage means.

* * * * *